350-96.1 SR CROSS REFERENCE SEARCH ROOM
XR 3,283,124
1A 50857
X 350/96

Nov. 1, 1966 R. J. KAWECKI 3,283,124

SELECTIVE HEATING APPARATUS

Original Filed July 2, 1962

INVENTOR
RICHARD J. KAWECKI

BY
Norman R. Bardales
ATTORNEY

3283124
OR IN 219/347

United States Patent Office 3,283,124
Patented Nov. 1, 1966

3,283,124
SELECTIVE HEATING APPARATUS
Richard J. Kawecki, Endicott, N.Y., assignor to International Business Machines Corporation, New York, N.Y., a corporation of New York
Original application July 2, 1962, Ser. No. 206,775, now Patent No. 3,230,338, dated Jan. 18, 1966. Divided and this application May 7, 1965, Ser. No. 470,335
5 Claims. (Cl. 219—347)

This is a division of application Serial Number 206,775 filed July 2, 1962 and now Patent Number 3,230,338 issued January 18, 1966.

The invention relates broadly to selective heating apparatus, and in particular to apparatus for providing restricted area heating to effect connections of electronic and electrical components, and component-carrying modules arranged in microminiature packages.

The present direction of developments in the area of electrical and electronic packaging is toward the use of extremely small components in a very closely spaced arrangement providing total units of high component density. Further, components are arranged to form modular structures having fixed circuit relations within the modules and where electrical connections to external circuitry are provided by spaced lands on outer surface portions. A complete modular circuit package may include a number of such modules arranged on a common interconnection surface, and it is with this latter general class of modular packaging arrangements that the present invention is contemplated as being especially useful.

Electrical connections in such modular circuits pose a difficult problem mainly because of the relatively small size of the modules and the large number of connections to be made to an individual module. For example, one such known module is approximately .300 x .300 x .020 inch and requires as many as seven electrical connections to be made along a single edge. It is clear that making these connections by the use of conventional soldering devices would not be a feasible process.

It is therefore a primary object of the invention to provide an apparatus for directing heat onto relatively small, sharply defined areas.

A further object of the invention is the provision of such an apparatus wherein a plurality of points arranged in a line are heated substantially simultaneously.

A further object of the invention is the provision of such an apparatus in which heat is simultaneously applied to pretinned areas to effect reflow soldering.

A still further object of the invention is the provision of such an apparatus in which heat in radiant energy form is directed in a formed beam onto a plurality of areas at which points solder reflow is to be effected.

Yet another object of the invention is the provision of a radiant energy lineal heating means in which surface tension forces of molten solder serves to bring a workpiece into registry with mating interconnection areas on a mounting means.

The foregoing and other objects, features and advantages of the invention will be apparent from the following more particular description of preferred embodiments of the invention, as illustrated in the accompanying drawings.

Figure 1:
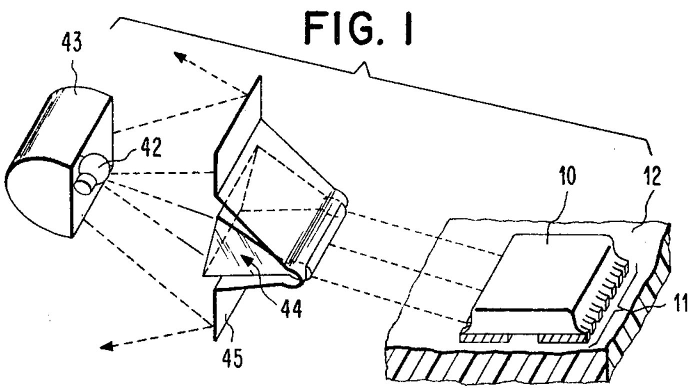
FIGURE 1 is a perspective view of an embodiment for practicing the invention.

With reference now particularly to FIGURE 1 and the embodiment of the invention illustrated therein, it is important to note first of all that although the invention is considered to have applicability to other and different types of workpieces, it will be described here in relation to effecting solder reflow electrical connections on a circuit modular package 10 in which regard it has been found to be especially useful. This package comprises a generally rectangular circuit base including electronic and/or electrical components mounted thereon and having a plurality of individual connection points 11 arranged along a pair of opposite edges in a spaced lineal manner. And it is a main purpose and function of the invention to direct heat onto these edge connection points and mating lands of an interconnection board 12 in registry therewith to effect solder reflow between respective points and lands. It is also contemplated that the modules 10 are relatively small, for example in the neighborhood of .300 of an inch square and of a thickness of .020–.050 inch, and that a plurality of such modules can be interconnected to form a so-called microminiature circuit or machine.

When effecting either solder reflow or conventional soldering, it is clear that excessive amounts of heat can quickly and easily damage the modules themselves, or the components carried thereby or burn off interconnection points and associated lands causing failure of the package. Further, because of the relatively small size of the soldering areas and the multiplicity of such areas in a small space, conventional soldering apparatus would be highly ineffectual and time consuming for a feasible production process.

The embodiment of the invention illustrated in FIGURE 1 is one in which the heating means, according to the invention, is effectuated by infra-red energy. More particularly, there is provided a special incandescent lamp 42 which provides an infra-red light beam. A concave reflector 43 is arranged in a semi-surrounding relationship to the heat source 42 for directing energy from the source along a path towards a special focusing means 44. The focusing means is enclosed in a similarly shaped back reflecting means 45 having surfaces facing in the general direction towards the source 42, but especially arranged so that such back reflection does not generally impinge on the source. This latter feature is important in that it increases the operational life of the source 42.

A small slit is provided in the reflector 45 for receiving similarly dimensioned portions of the focusing means 44 therethrough such that a narrow lineal element of concentrated infra-red energy is passed through the slit and focused onto the junction of the module 10 and the mounting board 12. Thus, whereas in my aforementioned patent the heating member was brought into physical contact with a portion of the lineal area at which heat was desired to be supplied, in this embodiment of the present application radiant energy is focused onto the line.

Figure 2:
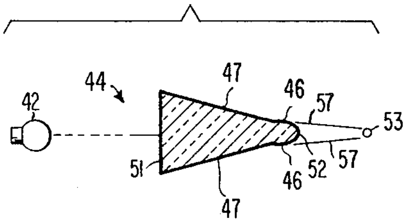
FIGURE 2 is an elevation sectional view of a special heat directing and forming means for the embodiment of FIGURE 1.
Figure 3:
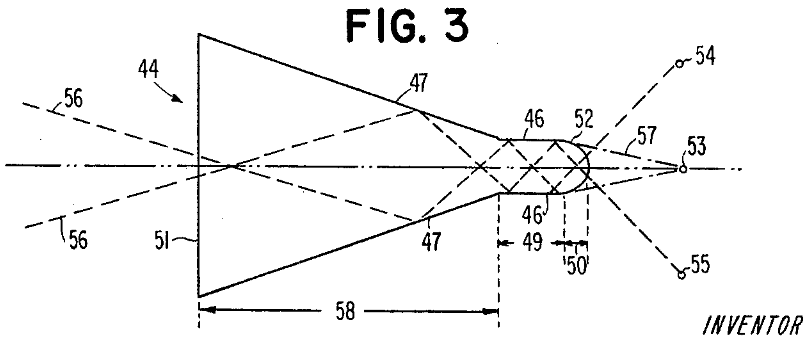
FIGURE 3 is a more detailed elevation view of the lens shown in FIGURE 2.

Certain specific constructional features of the focusing member 44 are of importance here. As shown best in FIGURE 2, when viewed along an edge looking at right angles to the direction of light propagation, it has a generally isosceles triangle shape where the incident energy impinges on the base and emerges generally at the opposite angle. Also, the edge along which light energy emerges is extended somewhat in the direction of light propagation to provide a pair of surfaces 46 substantially parallel to one another with the extremity being rounded off into a generally semi-cylindrical termination. It is this slight extension with the parallel sides which is received through the slit in the back reflector for focusing the infra-red energy in the desired manner. More particularly, light coming from the source 42 passes through the flat surface of the focusing means 44 for refraction at the curved end into a thin lineal element, and extraneous light is reflected backwardly and away from the source 42. As shown in greater detail in FIGURE 3, the lens 44 comprises three portions indicated generally by the reference numerals 48, 49, 50. Portion 48 is in the shape of a truncated triangle having a base 51 at one end and converging sides 47. Adjacent to the opposite or truncated end of portion 48 is an intermediary portion 49 having a generally rectangular shape and two parallel sides 46 which extend from the converging sides 47 as aforementioned. The body 44 is terminated in a third portion 50 which has a face 52 of a predetermined curvilinear shape which is illustrated as semi-cylindrical. Thus, as is shown in FIGURE 3, some of the energy from the lamp 42 is focused by the face 52 into the aforementioned concentrated image or line which appears in cross section as the circle 53 in FIGURE 3. On the other hand, some of the energy is diffused by the parallel sides 46 and face 52 into two adjacent side images, represented in cross section as circles 54, 55 in FIGURE 3. For purposes of illustration, the dash lines 56 represent the ray traces of some of the energy which produces the two adjacent side images 54, 55 and the dash-dot lines 57 represent the ray traces of some of the energy which produces the center image 53. For sake of clarity, only that part of the ray traces 57 emanating from the lens 44 are illustrated. Due to the configuration of the lens 44, the latter inherently provides a zone of less intensified thermal energy which surrounds the main image 53 and thereby provides a more uniform thermal distribution in the workpieces which are to be joined. More particularly, the main image is focused on the actual pretinned soldered or pretinned parts of the workpieces and the side images are disposed on the adjacent non-soldered parts. As a result, the temperature gradient between the actual parts and the adjacent non-soldered parts of the workpieces is not so pronounced and hence the causes of thermal fractures is thereby mitigated. In actual use, the exact amounts of energy required and the duration of heating will have to be determined for each particular type of application; however, specifics in this regard are considered mainly matters of design.

A further important feature here is the material from which the focusing means 44 is constructed. Although, of course, glass can be utilized to perform the function of focusing, it is not satisfactory here due to the high concentration of heat, which, even when used for a very short time, has been found to cause cracking in the glass. Or, when resort to high temperature glasses is made there is a concomitant high degree of infra-red absorption which is undesirable. The best material known for this purpose is salt (NaCl) which has a satisfactory high index of refraction, can withstand exceptionally high amounts of heat without becoming distorted or breaking down, and has a high transmissivity to infra-red. Salt, however, is hygroscopic and unless used in exceptionally dry environments it must be protected from the moisture. This is accomplished here by coating the surface of the means 44 with a coating 47 of a low melting glass material which isolates the salt surface from moisture bearing atmospheres. An alternative is to aluminize the surface of the means 44 a sufficient amount to protect the surface, but not so much as to reflect a significant amount of the infra-red.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for localized area heating of workpieces restingly contacting one another, at least one of said workpieces having a low melting metal coating at the localized area thereof, said apparatus comprising:

a source of infra-red energy, and heat directing means including a focusing means adapted to receive the infra-red energy and provide a concentrated beam of dimensions commensurate with those of the localized area while obstructing transmission of infra-red energy outside the beam, said focusing means comprising:

a lens system formed from an integral body having a first truncated triangular cross-section portion having a base at one end thereof and two converging sides, an intermediary second rectangular cross-section portion adjacent to the truncated end of said rectangular cross-section portion of said body and having two opposing parallel sides extending from the two converging sides of said first portion, and a third portion terminating in a face having a predetermined curvilinear shape, said body being positioned with respect to said infra-red source such that the infra-red energy enters the base of the first portion of said body and passes through said first, second and third portions of said body and emanates from the face of said third portion, some of said infra-red energy passing through said body being focused by said face into a line of concentrated thermal intensity and some of said infra-red energy passing through said body being diffused by said second rectangular cross-sectional portion of said body to provide a zone of lesser thermal intensity about said concentrated line, said workpieces being positioned with respect to the face of said body so that said concentrated line of thermal intensity lies substantially on the localized area to be heated to cause the metal coating to reflow and thereby effect the bonding of said workpieces.

2. Apparatus according to claim 1 wherein said heat direct means further comprises:

means for enclosing said focusing means, said means for enclosing having first aperture means through which at least the third portion of said body protrudes and having a second aperture exposing said base to said infra-red source.

3. Apparatus according to claim 1 wherein said lens is comprised of NaCl.

4. Apparatus as in claim 3, in which the lens is coated with a light transmissive material which is non-hygroscopic.

5. Apparatus according to claim 1 wherein said infra-red source comprises:

an infra-red lamp, and reflector means positioned with respect to said lamp to reflect said infra-red energy toward the base of said body.

References Cited by the Examiner

UNITED STATES PATENTS

| | | | |
|---|---|---|---|
| 1,965,865 | 7/1934 | Thompson | 240—1 X |
| 2,077,102 | 4/1937 | Fardon | 240—1 X |
| 2,364,730 | 12/1944 | Leskin. | |
| 2,561,077 | 7/1951 | Tilton | 88—57 X |
| 2,604,005 | 7/1952 | Hahn. | |
| 2,945,958 | 7/1960 | Morris | 88—1 X |

FOREIGN PATENTS

| | | |
|---|---|---|
| 752,400 | 6/1953 | Germany. |
| 938,499 | 2/1956 | Germany. |
| 264,814 | 12/1927 | Great Britain. |

ANTHONY BARTIS, *Primary Examiner.*